(12) United States Patent
Milton et al.

(10) Patent No.: US 12,222,940 B2
(45) Date of Patent: *Feb. 11, 2025

(54) CONFIGURABLE ENTITY MATCHING SYSTEM

(71) Applicant: SAP SE, Walldorf (DE)

(72) Inventors: Quincy Milton, Bellevue, WA (US); Henry Tsai, San Francisco, CA (US); Uma Kale, Sammamish, WA (US); Adam Horacek, Chorvatsky Grob (SK); Justin Dority, Vancouver (CA); Phillip DuLion, Kirkland, WA (US); Ian Kelley, Seattle, WA (US); Michael Lentz, Seattle, WA (US); Ryan Skorupski, Bellevue, WA (US); Aditi Godbole, Seattle, WA (US); Haizhen Zhang, Bothell, WA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/138,944

(22) Filed: Apr. 25, 2023

(65) Prior Publication Data

US 2023/0325385 A1  Oct. 12, 2023

Related U.S. Application Data

(63) Continuation of application No. 17/751,927, filed on May 24, 2022, now Pat. No. 11,669,524, which is a (Continued)

(51) Int. Cl.
*G06F 16/00* (2019.01)
*G06F 16/2453* (2019.01)

(52) U.S. Cl.
CPC ............ *G06F 16/24539* (2019.01)

(58) Field of Classification Search
CPC .......... G06F 16/24539; G06F 16/2455; G06F 16/288; G06F 16/2453
See application file for complete search history.

(56) References Cited

U.S. PATENT DOCUMENTS 9,189,515 B1 * 11/2015 Tamilmani ............ G06F 16/245
11,372,857 B2     6/2022 Milton et al.
(Continued)

OTHER PUBLICATIONS

"U.S. Appl. No. 17/084,107, Non Final Office Action mailed Oct. 28, 2021".

(Continued)

*Primary Examiner* — Dinku W Gebresenbet
(74) *Attorney, Agent, or Firm* — SCHWEGMAN LUNDBERG & WOESSNER, P.A.

(57) ABSTRACT

Systems and methods are provided for receiving an input comprising one or more attributes, selecting a subset of query options from a list of query options relevant to the attributes of the input, and based on query optimization results from an audit of previous queries, determining a priority order to execute each query in the set of queries based on the query optimization results, and executing each query in the priority order to generate a candidate list. For each candidate in the list of candidates, systems and methods are provided for selecting a subset of available workflows based on relevance to the candidate and based on workflow optimization results, determining an order in which the selected subset of workflows is to be executed, and executing the selected subset of workflows in the determined order to generate a match score indicating the probability that the candidate matches the input.

20 Claims, 7 Drawing Sheets

Related U.S. Application Data continuation of application No. 17/084,107, filed on Oct. 29, 2020, now Pat. No. 11,372,857.

(56) References Cited

U.S. PATENT DOCUMENTS

| | | | | |
|---|---|---|---|---|
| 2015/0026692 | A1* | 1/2015 | Ghosh | G06F 16/245 718/103 |
| 2017/0147296 | A1* | 5/2017 | Kumar | G06Q 10/06 |
| 2017/0339158 | A1* | 11/2017 | Lewis | H04L 67/1025 |
| 2020/0210898 | A1* | 7/2020 | Tamagawa | G06Q 50/04 |
| 2022/0028378 | A1* | 1/2022 | Jones | G06F 16/9532 |
| 2022/0138198 | A1 | 5/2022 | Milton et al. | |
| 2022/0284022 | A1 | 9/2022 | Milton et al. | |

OTHER PUBLICATIONS

"U.S. Appl. No. 17/084,107, Notice of Allowance mailed Mar. 7, 2022".

"U.S. Appl. No. 17/084,107, Response filed Jan. 10, 22 to Non Final Office Action mailed Oct. 28, 21", 11 pgs.

"U.S. Appl. No. 17/751,927, Non Final Office Action mailed Oct. 27, 2022", 26 pgs.

"U.S. Appl. No. 17/751,927, Notice of Allowance mailed Jan. 25, 2023", 8 pgs.

"U.S. Appl. No. 17/751,927, Response filed Nov. 29, 2022 to Non Final Office Action mailed Oct. 27, 2022", 10 pgs.

"European Application Serial No. 20214487.9, Extended European Search Report mailed May 31, 2021", 10 pgs.

Bhattacharya, Indrajit, et al., "Query-Time Entity Resolution (Research Track Poster)", Proceedings of the Twelfth ACM SIGKDD International Conference on Knowledge Discovery and Data Mining, (2006), 529-534.

Bilenko, M, et al., "Adaptive Product Normalization: Using Online Learning for Record Linkage in Comparison Shopping", Fifth IEEE International Conference on Data Mining, (2005), 8 pgs.

Levy, Alon, et al., "Querying Heterogeneous Information Sources Using Source Descriptions", Proceeding of the 22nd International Conference on Very Large Data Bases, [Online]. Retrieved from the Internet: <URL: http://ilpubs.stanford.edu:8090/191/1/ 1996-61. pdf>, (1996), 26 pgs.

* cited by examiner

CONFIGURABLE ENTITY MATCHING SYSTEM

CLAIM OF PRIORITY

This application is a continuation of U.S. application Ser. No. 17/751,927, filed May 24, 2022, which is a continuation of U.S. application Ser. No. 17/084,107, filed Oct. 29, 2020 and issued as U.S. Pat. No. 11,372,857 on Jun. 28, 2022, of which all applications are incorporated by reference in their entireties.

BACKGROUND

Identifying the same entity represented differently across diverse systems is a challenge. For example, entities may reside in distributed heterogeneous data sources and each data source may have various bits of information about each entity. The task of matching multiple representations of the same real-world entity is not easy because of limited data quality, incomplete data, and inconsistency across systems. Moreover, the sheer amount of data does not lend itself to matching in any simple or manual way.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to a configurable entity matching system. As explained above, the task of matching multiple representations of the same real-world entity is not easy because of limited data quality, incomplete data, and inconsistency across systems. Moreover, the sheer amount of data does not lend itself to matching in any simple or manual way. Example embodiments provide a system for dynamically determining a best process to query multiple sources for potential candidates that may match an input, a best process for matching the candidates to the input, and providing a feedback loop to optimize the process to query multiple sources and the process to match candidates to the input. Accordingly, example embodiments provide for dynamically selecting and optimizing processes to recognize like entities, such as organizations, transactions, employees, spend categories, and so forth, across different data sources.

For example, a computing device receives an input comprising one or more attributes and accesses a query configuration comprising a list of query options to select a subset of query options from the list of query options relevant to the attributes of the input, and based on query optimization results from an audit of previous queries. The computing system also determines a priority order to execute each query in the set of queries based on the query optimization results and translates each query option of the subset of query options into a query comprising at least one attribute of the one or more attributes of the input, to generate a set of queries. The computing system executes each query in the priority order to generate a candidate list comprising a list of candidates that potentially match the input and accesses a workflow configuration comprising a list of workflows for determining whether an input matches a candidate. For each candidate in the list of candidates, the computing system selects a subset of available workflows based on relevance to the candidate and based on workflow optimization results from an audit of previous workflow executions, determines an order in which the selected subset of workflows is to be executed based on the workflow optimization results, and executes the selected subset of workflows in the determined order to generate a match score indicating the probability that the candidate matches the input. The computing system provides an output indicating at least the candidates that matched the input based on the generated match score for each candidate.

Figure 1:
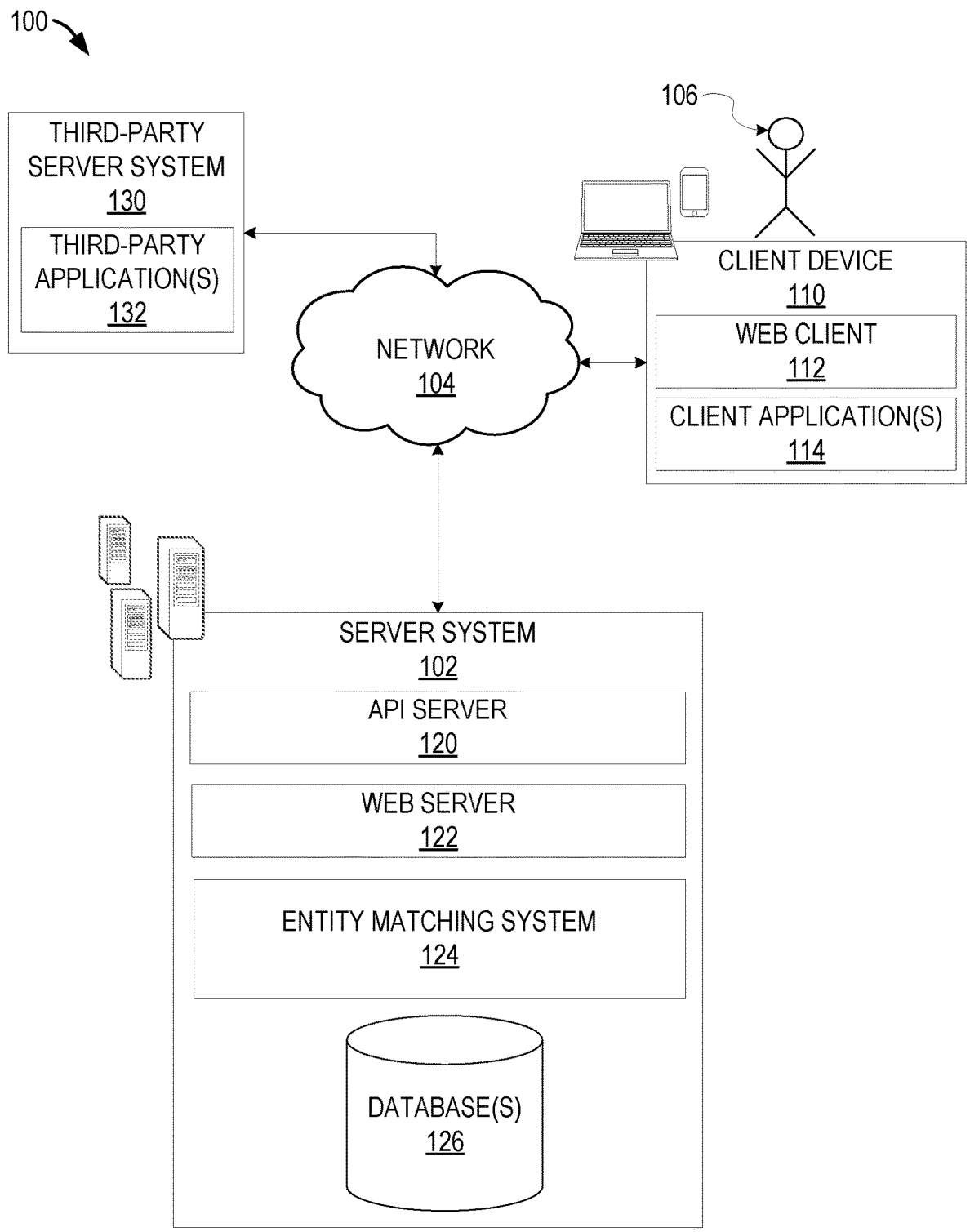
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other computing or communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user 106 that is used to access and utilize cloud services, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party server system 130, server system 102) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110. In one example, the user is a developer of one or more applications (e.g., mobile and desktop web applications) or a quality assurance engineer.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, a procurement, spend management and supply chain services application, entity matching system, and the like.

In some embodiments, one or more client applications 114 may be included in a given client device 110, and configured to locally provide the user interface and at least some of the functionalities, with the client application(s) 114 configured to communicate with other entities in the system 100 (e.g., third-party server system 130, server system 102, etc.), on an as-needed basis, for data and/or processing capabilities not locally available (e.g., access location information, access software version information, access an ERP system, access a CRM system, access machine learning models, access procurement, spend management and supply chain services, entity matching system, to authenticate a user 106, to verify a method of payment, access test data, and so forth), to search for a supplier, for catalog or non-catalog requisitions, and so forth. Conversely, one or more applications 114 may not be included in the client device 110, and then the client device 110 may use its web browser to access the one or more applications hosted on other entities in the system 100 (e.g., third-party server system 130, server system 102).

A server system 102 may provide server-side functionality via the network 104 (e.g., the Internet or wide area network (WAN)) to one or more third-party server system 130 and/or one or more client devices 110. The server system 102 may include an application program interface (API) server 120, a web server 122, and an entity matching system 124 that may be communicatively coupled with one or more databases 126.

The one or more databases 126 may be storage devices that store data related to users of the system 100, applications associated with the system 100, cloud services, machine learning models, and so forth. The one or more databases 126 may further store information related to third-party server system 130, third-party applications 132, client devices 110, client applications 114, users 106, and so forth. In one example, the one or more databases 126 is cloud-based storage.

The server system 102 may be a cloud computing environment, according to some example embodiments. The server system 102, and any servers associated with the server system 102, may be associated with a cloud-based application, in one example embodiment.

The entity matching system 124 may provide back-end support for third-party applications 132 and client applications 114, which may include cloud-based applications. The entity matching system 124 may provide for match results between an input and query candidate results, among other things, as described in further detail below. The entity matching system 124 may comprise one or more servers or other computing devices or systems.

The system 100 further includes one or more third-party server system 130. The one or more third-party server system 130 may include one or more third-party application(s). The one or more third-party application(s) 132, executing on third-party server(s) 130, may interact with the server system 102 via API server 120 via a programmatic interface provided by the API server 120. For example, one or more of the third-party applications 132 may request and utilize information from the server system 102 via the API server 120 to support one or more features or functions on a website hosted by the third party or an application hosted by the third party.

The third-party website or application 132, for example, may provide access to functionality and data supported by third-party server system 130. In one example embodiment, the third-party website or application 132 may provide access to functionality that is supported by relevant functionality and data in the third-party server system 130. In one example, a third-party server system 130 is a system associated with an entity that accesses cloud services via server system 102.

Figure 2:
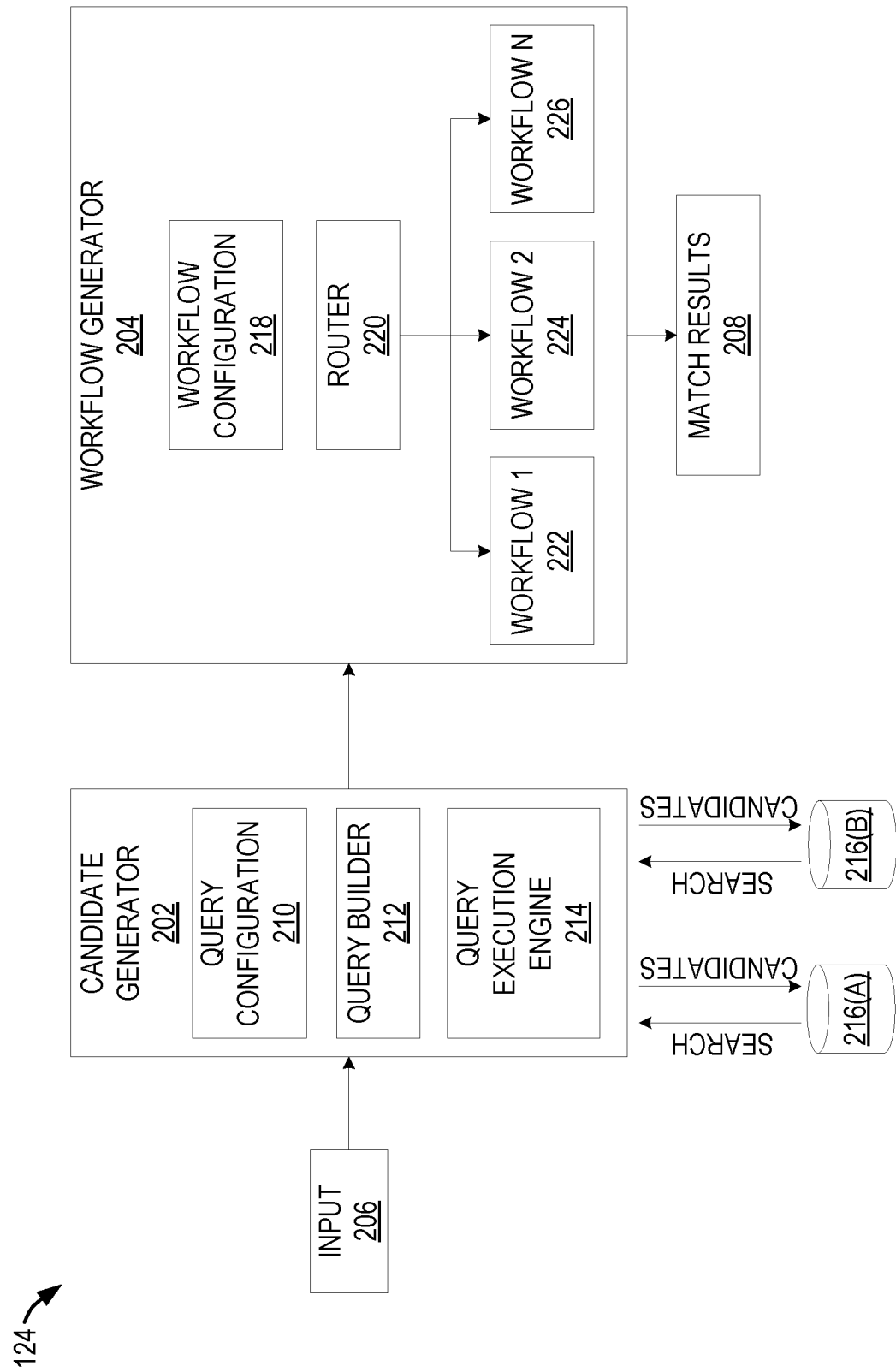
FIG. 2 is a block diagram illustrating an entity matching system, according to some example embodiments.

FIG. 2 is a block diagram illustrating further details of entity matching system 124. The entity matching system 124 takes an input 206 and outputs match results 208 for that input 206 (e.g., identifies the same entity represented in different formats across systems). The entity matching system 124 comprises a candidate generator 202 and a workflow generator 204.

The candidate generator 202 generates a list of candidates that are potential matches to an input 206. The candidate generator 202 accesses a query configuration 210 that comprises a comprehensive list of query options. In one example, the query options comprise a configuration of multiple queries specifying one or more query operators and filters that are maintained in the query configuration 210. The following is an example definition of configuration for each of four different queries (e.g., query options):

```

kind: Query
name: search with company name
spec:
    type: organizations
    priority: 1
    take: 50
    steps:
        name: remove stop words on input.name
        remove_stop_words:
            path: $.name
    filters:
        input: $.name
        filter: name
        operation: fuzzy
---
kind: Query
name: search with location data
spec:
    type: organizations
    priority: 3
    take: 20
```

```
    filters:
       input: $.address.[*].address.city
       filter: address.city
       operation: eq
---
  kind: Query
  name: fuzzy with name on organization
  spec:
    type: organizations
    priority: 1
    take: 50
    steps:
       name: remove stop words on input.name
       remove_stop_words:
          path: $.name
    filters:
       input: $.name
       filter: name
       operation: fuzzy
---
  kind: Query
  name: fuzzy with city on organization
  spec:
    type: organizations
    priority: 2
    take: 30
    filters:
       input: $.externalIds.[0].id
       filter: externalIds.id
       operation: eq
```

And the following provides an example of further details of the attributes of the definition for each query option:

| | |
|---|---|
| kind: | Type of configuration, always set to the value "Query" |
| name: | Unique name for the query that is used as an identifier |
| spec: type: | Entity to be queried from the source system |
| spec: priority: | A different priority is set for each query; if the same candidate is generated out of different queries, the one with the higher priority is considered as the source query |
| spec: take: | Query result set limit |
| spec: steps | The set of refinement operations to be executed on the query parameter value prior to query execution |
| spec: steps: name | Descriptive name of the refinement step Followed by the refinement operation name available in the match service. |
| spec: filters | Query parameter value path from the input payload Set of query parameter elements. If multiple filters are set, they shall be evaluated as an AND condition in the query |
| spec: filters: input | Query parameter value path from the input payload |
| spec: filters: filter | Query parameter element in the candidate source system |
| spec: filters: operation | Query operation to be executed |

The query builder 212 selects the relevant query options for the input and translates each of the query options into a query comprising one or more attributes of the input. In one example, the query builder 212 translates configured query specifications into a syntax that can be executed in a database. The following example demonstrates one way the query builder 212 can transform the configured query into a graphQL syntax. For instance, the first two query options listed above (e.g., "search with company name" and "search with location data"), can be translated into a query as follows:

```
For query option "search with company name:"
query ($v0: [String]) {
   organizations(filter: {name: {fuzzy: $v0}}) {
     sbnid name legalName company Size tradingStyles
     websites { url }
     tradedAs { ticker exchange }
     externalIds { id source }
     relatedIds { id source }
     addresses { ..
       sbnid type
       address {
         street1 street2
         city { name }
         county { name }
         stateProvince { name abbreviation }
         countryRegion { name abbreviation }
         zipPostalCode { name }
       }
     }
   }
}

For query option "search with location data:"
query( $v[ ]: [List]) {
   organizations(filter: {addresses: {address: {city: {name: {in: I
city[0], city
[1], city [nl1 }}}}}) {
     sbnid name legalName company Size tradingStyles
     websites { url }
     tradedAs { ticker exchange }
     externalIds { id source }
     relatedIds { id source }
     addresses {
       sbnid type
       address {
         sbnid street1 street2
         city { name }
         county { name }
         stateProvince { name abbreviation }
         country Region { name abbreviation }
         zipPostalCode { name }
       }
     }
   }
}
```

In one example, the query builder 212 also selects the relevant query options for the input based on query optimization results from an audit of previous queries, which can be stored in one or more datastores, such as database(s) 126 shown in FIG. 1. Further details on query generation and the audit process are described below with respect to FIGS. 3A-3B.

The query execution engine 214 executes the queries (e.g., by accessing one or more datastores, such as databases 216(a) and 216(b)) to return query results to generate a candidate list comprising candidates that potentially match the input. Each query produces a result set (e.g., a candidate list for that query). A union of these results creates the final candidate list. In one example, the candidate generator 202 removes duplicates to produce the final candidate list. The candidate list is provided to the workflow generator 204.

The workflow generator 204 configures different workflows to execute matching. Each workflow uses a predicate rule, machine learning model, and/or other method to make a match decision between the input and a candidate from the candidate list generated by the candidate generator 202. The concept of a workflow offers the possibility to combine many pre-processing operations on the input-candidate pair to define a specific match strategy. Each workflow is a collection of steps that allows refinement of data, feature engineering calculations, and core match operations. A workflow is a set of execution steps to be performed on a given input-candidate pair. The workflow can consist of the operations such as refinement operations, feature engineering operations, and core match functions.

Refinement operations are used to cleanse the data to use it in a form that is expected to yield a better result than its original form. The following illustrates example refinement actions can be available for use in a workflow definition.

| Workflow Step | Function | Description |
| --- | --- | --- |
| remove_stop_words | Removes identified stop words from the given path in the data | This refinement operation on "Acme Systems Incorporated" shall result in "Acme Systems" |
| normalize_address | Normalizes address using the address normalization service | The response is dependent on the api/library used in an address normalization service |
| normalize_business_name | Expands the company name | This refinement operation on "IBM Corp" shall result in "International Business Machines Corporation" |
| extract_domain_name | Extracts the domain name from a URL | This refinement operation on "https://www.sap.com/india/industries/healthcare.html" shall result in "sap" |
| regex_replace | Match sequence of characters in a regular expression using specialized syntax held in a pattern | |
| get_main_zipPostalCode | Get the main zip postal code when extended postal code is available in the data | This refinement operation on "98765-4321" shall result in "98765" |
| get_normalized_phone | Normalize phone to a standard format | |
| refine_industry | Based on industry codes a translated description as maintained in the system shall be returned | |

Feature generation is the process of creating new features from one or more existing features. The process adds new information that the workflow can use in its evaluation, whether through an ML model or a predicate rule. For example, calculating the geographic distance in miles between two addresses or detecting the language of a piece of text are both potential feature generation processes.

The following illustrates example feature engineering options that can be available for use in a workflow definition.

| Workflow Step | Function | Example |
| --- | --- | --- |
| string_distance | Similarity metric measuring distance between two strings | Levenshtein distance between input and candidate "name" Hamming distance between input and candidate "street" |
| tradestyle_overlap | Tradestyles are name aliases and overlap measure between them gives an accurate indication of name similarity | Input aliases-Hyatt Shanghai, Hyatt Corporation Candidate aliases-Hyatt Corp, Hyatt Tradestyle overlap will result in 1, as the aliases indicate the same name |

The following illustrates example core match functions that can be available for use in a workflow definition:

| Workflow Step | Function | Example |
| --- | --- | --- |
| ml_match | Input-Candidate pair evaluated by the Machine Learning model | Machine Learning model specified in the workflow configuration evaluates the set of specified features of input-candidate pair to give a match score between 0 to 1 |
| rules_match | Input-Candidate pair evaluated by the predicate set (rules) | Predicate or rule set defined in the workflow configuration evaluates input-candidate pair to give a match score of either 0 or 1. 1 being the exact match and 0 being no match |

The workflow generator 204 accesses a workflow configuration 218 that comprises a comprehensive list of workflow options. The following is an example definition of a workflow configuration (e.g., workflow option):

```
kind: Workflow
name: full match
spec:
    conditions:
        has name
    steps:
        name: remove stop words from input.name
        remove_stop_words:
            path: input.name
        name: set name distance
        feature: name_distance
        string_distance:
            path1: input.name
            path2: candidate.name
        name: match using name_and_address ruleset
        rules_match:
            ruleset: name_and_address
```
And the following provides an example of further details of the attributes of the definition for each workflow option:

| kind: | Type of configuration, always set to the value "Workflow" |
|---|---|
| name: | Unique name for the workflow that is used as an identifier |
| spec: conditions: | The router conditions that make this workflow applicable for an input-candidate pair. |
| spec: steps: | The set of refinement, feature engineering and core operations to be executed as a workflow |
| spec: steps: name | Descriptive name of the workflow step followed by the operation names available in the match service. The refinement and feature engineering operations provide the path of the parameter used in the operation. The result of the feature engineering operation is available in the variable specified in "feature: variable" |

The router 220 inspects each input-candidate pair (e.g., the input paired with each candidate in the final candidate list) and builds a set of workflows to be executed for each input-candidate pair and a priority order in which the workflows of the set of workflows are executed. In one example, the router 220 also selects the relevant workflow options for an input-candidate pair based on workflow optimization results from an audit of previous workflow executions, which can be stored in one or more datastores, such as database(s) 126 shown in FIG. 1. Further details on workflow generation for an input-candidate pair and audit process are described below with respect to FIGS. 3A-3B.

In one example, a route configuration guides the router 220 on selection of the relevant workflows. For example, one workflow could be defined with a route condition of "completable address," as shown in the example below:

```
WF1
    routes:
        completable-address
```

In the route configuration, the meaning of this route can be specified, such as:

```
Route completable-address
    an address that has street and zipcode
```

In one example, route configurations comprise criteria that the router can use to determine if a specific workflow is applicable to the input-candidate pair. The criteria can act on any field or feature of the input-candidate pair. Consider that there are many workflows. Some of the workflows are designed to evaluate similarity between organizations while some others are designed for evaluating similarity of other entities. The route conditions tell the router which workflows apply the data that it is trying to evaluate. If the router has an input-candidate pair that is an organization, it can use the route conditions to select only those workflows that apply to organizations. In practice the route conditions are much more granular, such as criteria that specifies only organizations with specific attributes such as complete address information, specific geo-locations (i.e. Chinese organizations vs. US organizations), or organizations that have web address information.

The following is an example definition of a route configuration:

```
kind: Route
name: has name
spec:
    conditions:
        input: $.input.name
        candidate: $.candidate.name
        condition: m.input.name & m.candidate.name
```

And the following provides an example of further details of the attributes of the definition for the route configuration:

| kind: | Type of configuration, always set to the value "Route" |
|---|---|
| name: | Unique name for the route that is used as an identifier |
| spec: conditions | The set of conditions that makes a workflow applicable for an input-candidate pair |

Each input-candidate pair may have its own set of workflows (e.g., workflow 1 (222), workflow 2 (224), workflow n (226)) to be executed. An input-candidate pair can have a single workflow or multiple workflows that creates its path of execution. Every selected candidate is routed via a series of workflows that are best suited to evaluate the input-candidate pair. All selected workflows are executed until a match is found or all workflows are completed.

In one example, workflow execution for different generated candidates is asynchronous since multiple configured queries produce the potential candidates with different response times, and thus, each are evaluated asynchronously in this example. The execution of the set of workflows for a given candidate is sequential. In one example, the match results for all candidates are sorted before returning the response to the input.

Figure 3A:
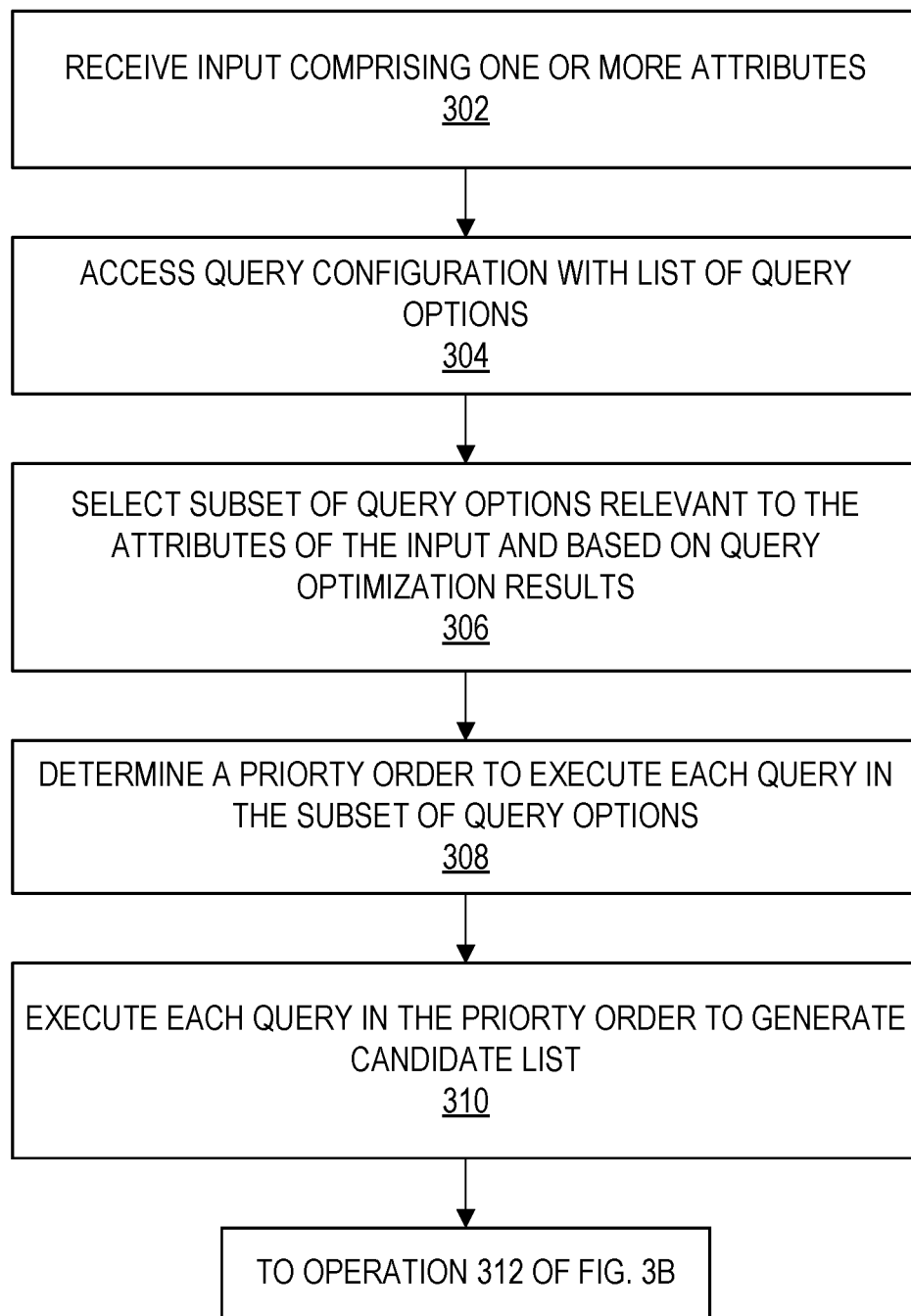
FIGS. 3A and 3B comprise a flow chart illustrating aspects of a method for generating match results for an input, according to some example embodiments.
Figure 3B:
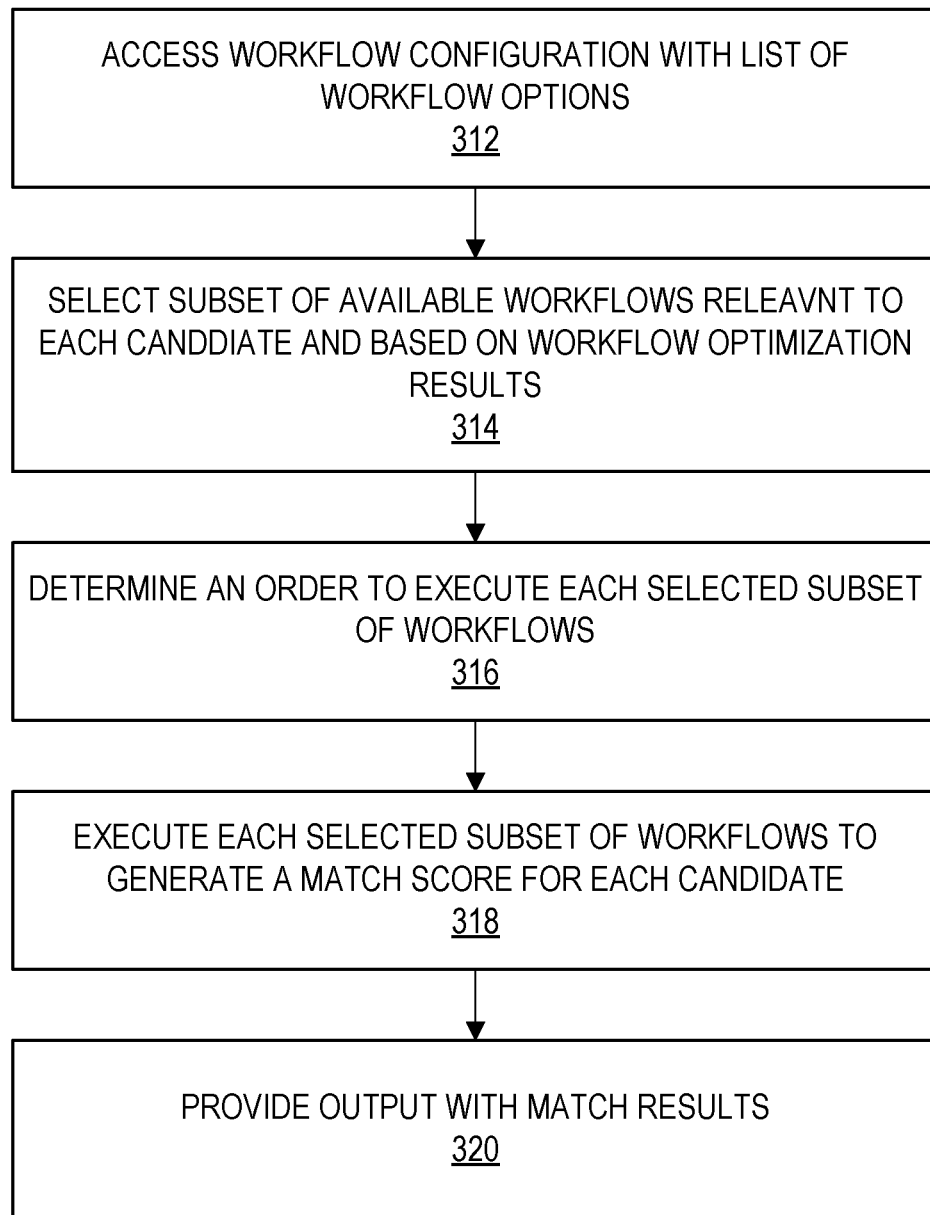

FIG. 3A and FIG. 3B illustrate a flow chart illustrating aspects of a method 300 for generating match results for an input, according to some example embodiments. For illustrative purposes, method 300 is described with respect to the block diagrams of FIG. 1 and FIG. 2. It is to be understood that method 300 may be practiced with other system configurations in other embodiments.

In operation 302, a computing system (e.g., server system 102 or entity matching system 124), receives an input comprising one or more attributes. For example, the computing system may receive a match request comprising the input from an end user via a client device 110, from a third-party sever system 130, or other computing device or system. The input comprises one or more attributes, such as an entity name (e.g., company name), address, invoice identifier, image, or another attribute. The following is a sample payload in a request to match an organization:

```
{
"objectType": "Organization",
"name": "Vmware",
"addresses": [
{
"type": "PayTo",
"address": {
"objectType": "Address",
"street1": "1st Avenue",
"city" : {"objectType": "City", "name": "New York" },
```

```
"stateProvince": {"objectType": "StateProvince", "abbreviation": "NY",
    "name": "NewYork"},
"countryRegion": {"objectType": "CountryRegion", "abbreviation":
"USA"},
"zipPostalCode": {"objectType": "ZipPostalCode", "name": "10009"}}}]
}
```

In one example, the received input (e.g., payload) is validated against an object schema that resides in data model definitions in one or more datastores (e.g., databases 126) and a request context is set. In one example, the request context provides a context of the entity being matched. For example, a context may be a location site, a supplier company, an invoice document, and so forth. Essentially, the request context is another attribute of the input that the requestor can manually set for the query when they call the service. The system uses this information like any other attribute to help it select the appropriate queries and workflow evaluations.

In operation 304, the computing system accesses a query configuration comprising a list of query options, as described above, such as, for example, the computing system accesses query configuration 210 which may be stored in one or more databases 126. In operation 306 the computing system selects a subset of query options from the list of query options relevant to the attributes of the input to find the best matches to the input. For example, if the input is a company name and address, the computing system selects the query options related to an organization (e.g., with "type" of "organizations" as in the example query options above), or if the input is an image, the computing device selects the query options related to an image. As another example, if the input is a company name, a query option including a stock ticker or an image would not be selected.

In one example, the computing system further selects the subset of the query options based on query optimization results from an audit of previously executed queries. For example, the computing system stores data for past queries executed by the computing system (e.g., in one or more databases 126). The computing system then selects a subset of the previously run queries and results to generate a confusion matrix for each query. Using the confusion matrix, the computing system can derive metrics for each query and store the metrics as optimization results in one or more datastores (e.g., databases 126). In one example, the metrics comprise precision and recall.

For example, the computing system selects a subset of the previously run queries and presents the input and results to be displayed on a computing device (e.g., client device 110). An end user selects which ones are correct and which ones are not correct (e.g., to verify whether each result matched the input or not). Then the computing system uses the data provided on which results (e.g., candidates) are correct and which are not correct for each query to generate the confusion matrix. A confusion matrix is a table that allows visualization of a performance of an algorithm, or in this case, a query option. The computing system next derives metrics, such as precision and recall, from the confusion matrix to generate an accuracy score for each query. It is to be understood that other methods and metrics can be used in example embodiments.

In one example, the following different metrics can be generated for a query:
Confusion Matrix (True Positive, False Positive, True Negative,
Accuracy
Precision
Recall
One example of generated metrics for a query includes:
Query: Fuzzy on tradingstyles for org

| Actual\Predicated | Retrieved candidate | Not retrieved candidate |
|---|---|---|
| Positive | True Positive: 2,699 | False Positive: 1,699 |
| Negative | False Negative: 181 | N/A |
| Accuracy: | Precision: | Recall: |
| 93.472% +/− 0.285% | 61.369 +/− 0.562% | 93.715% +/− 0.280% |

For the above example query:
True Positive (TP)—Correct candidates generated
False Positive (FP)—Incorrect candidates generated
False Negative (FN)—Correct candidates not generated
True Negative (TN)—Incorrect candidates not generated
Precision=TP/(TP+FP)
Recall=TP/(TP+FN)
Accuracy=(TP+TN)/(TP+TN+FP+FN)

Where recall is the number of relevant documents retrieved by a search divided by the total number of existing relevant documents, while precision is the number of relevant documents retrieved by a search divided by the total number of documents retrieved by that search.

For candidate generation queries, one goal is to maximize both precision and recall within some cost constraint. As defined above, recall measures how often the query returns a matching candidate while precision measures how many non-relevant candidates were returned in order to find the relevant ones. The simplest way to maximize recall is to return all candidates. This guarantees that the list of candidates includes the relevant one(s), however, the precision associated with this approach is very bad because there would be many non-relevant candidates returned. By maximizing both metrics, the computing system can optimize the candidate generation process to return the smallest list of candidates that has a high probability of containing the relevant/matching candidate(s). Unfortunately, it is very expensive (computing resources) to maximize both recall and precision. Therefore, the computing system is optimized to maximize both recall and precision with the minimal cost.

The optimization results can be updated regularly based on updated audits done on a periodic basis (e.g., based on new or additional data) so that the optimization results are always up to date and most accurate. In this way the computing system has an automatic feedback loop to tweak query options (and also workflow options as described below) to continuously adapt to changing data and use cases. This feedback loop is also used to improve machine learning models described herein.

The optimization results for each query, such as metrics, can then be used to select the best query options for a given input, which provides for a more efficient and effective system and results. For example, instead of using all of the relevant query options (e.g., taking up valuable processing resources), the computing system selects the query options relevant to the input that have an accuracy score (or other metric) above a certain threshold. For instance, an accuracy score may be between 0 and 1. A threshold may be set at 0.85. Thus, the computing system would only select query options relevant to the input that have an accuracy score over 0.85. For example, the computing device determines that there are 10 query options relevant to a given input. In this example, query option 1 has an accuracy score of 0.91, query option 2 has an accuracy score of 0.45, query option 3 has an accuracy score of 0.89, query option 4 has an accuracy score of 0.97, query option 5 has an accuracy of 0.73, and the rest of the query options have an accuracy of 0.32, 0.80, 0.44, 0.69, and 0.84 respectively. The computing system would select query options 1, 3, and 4 since they all have an accuracy score over the threshold 0.85 accuracy score.

In another example, the computing system can select query options based on cost. For example, consider four potential queries for an input with the following recall, precision, and cost:

Query 1: Recall=0.2, Precision=0.3, cost: $1
Query 2: Recall=0.2, Precision=0.9, cost: $3
Query 3: Recall=0.8, Precision=0.3, cost: $2
Query 4: Recall=0.8, Precision=0.9, cost: $10

If the computing system can only spend $5 to get candidates, the computing system would only execute query 2 and 3 because those queries maximize precision and recall within the cost constraints.

The computing system translates each query option of the subset of query options into a query comprising at least one attribute of the one or more attributes of the input, to generate a set of queries. For example, the query option may be a human-configured (e.g., by an end user administrator) query option that is then translated into a language which is understood by the particular source to be searched (e.g., database), as explained above.

In one example the computing system also determines a priority order to execute each query in the set of queries, in operation 308. The priority order can also be determined based on query optimization results. For example, the input may be a company name and the selected query options 1, 3, and 4 may include a query on refinement of company name (e.g., Ritz Carleton Burlingame is refined to Ritz Carleton) plus equality on the refined company name (query option 1), equality on the company name (query option 3), and removing stop words plus fuzzy overlap (e.g., determining how similar the names are and if above a threshold then return a result as a candidate) (query option 4). In one example, the computing system prioritizes the query options from the highest accuracy score to the lowest accuracy score. In this example, the query options would be prioritized to execute query option 4 (with an accuracy score of 0.97), query option 1 (with an accuracy score of 0.91), and query option 3 (with an accuracy score of 0.89).

In another example, the following four potential queries may be selected for an input:

Query 1: Recall=0.2, Precision=0.3
Query 2: Recall=0.2, Precision=0.9
Query 3: Recall=0.8, Precision=0.3
Query 4: Recall=0.8, Precision=0.9

Using this information, the computing system would execute the queries in the following priority order: 4, 3, 2, 1.

In operation 310, the computing system executes each query in the priority order to generate a candidate list comprising a list of candidates that potentially match the input.

In one example, a number of candidates desired can be specified and each query is executed in priority order until the specified number of candidates is generated, after which the execution of each query in priority order is terminated.

For instance, the specified number of candidates desired may be 100. Execution of query option 4 may result in 45 candidates, and execution of query option 1 may result in 57 candidates. Thus, the execution of the subset of query options would terminate after the execution of query option 1 since the number of desired candidates has been achieved.

In operation 312, the computing system accesses a workflow configuration comprising a list of workflows for determining whether an input matches a candidate. For each candidate in the list of candidates, the computing system selects a subset of available workflows based on relevance to the candidate (and optionally based on workflow optimization results from an audit of previous workflow executions), determines an order in which the selected subset of workflows is to be executed based on the workflow optimization results, and executes the selected subset of workflows in the determined order to generate a match score indicating the probability that the candidate matches the input.

In operation 314, the computing system selects a subset of available workflows based on relevance to the candidate. In one example, the computing system may further select the subset of available workflows based on workflow optimization results from an audit of previous workflow executions.

For example, the computing system determines the type of input and then determines the workflows relevant to the type of input. For instance, if the input is a name, the computing system determines workflows relevant to a name. The following shows some simple examples of input and relevant workflows. It is to be understood there could be quite a number of workflows and relevant workflows for any given input-candidate pair.

| Data | Route | Workflow |
|---|---|---|
| Input-Candidate contains name | has name | 1-with name<br>2-with name or externalId |
| Input-Candidate contains externalId | has externalId | 2-with name or externalId |
| Input-Candidate contains both name and externalId | has name<br>has externalId<br>has both name and externalId | 1-with name<br>2-with name or externalId<br>3-with name and externalId |

Thus, for the example where the input-candidate contains a name, the set of workflows includes workflow 1 and workflow 2 since workflow 1 and workflow 2 are relevant to an input-candidate that contains a name.

As explained above, a workflow uses a predicate rule, machine learning model, and/or other method to make a match decision between the input and a candidate from the candidate list. An example of a workflow configuration for a machine learning model for a match decision includes:

name: match using 6 features model
    ml_match:
      model: site-6f (sagemaker-xgboost-200320-1732-012-5740ff8e)
      features:
        name_distance
        street_distance
        city_distance
        state_distance
        country_distance
        zipcode_distance
        name_exists
        street_exists
        city_exists
        state_exists
        country_exists
        zipcode_exists Using a machine leaning model in an organization match, for example, expects the following data: (1) string distance between input and candidate of the supported features and (2) flag indicating presence of feature in both input and candidate. For an exact match of name and the address (street, city, state, country, zipcode), the feature vector is generated as an input to the ML model:

[[100], [100], [100], [100], [100], [100], [0], [0], [0], [0], [0], [0]]

where 100 indicates the exact match between the compared string and 0 indicates that the feature is present in both input and candidate. The Sagemaker endpoint specified in the machine learning match configuration is called with the feature vector.

In terms of a rule used in a workflow to make a match decision between an input and a candidate from the candidate list, multiple rule files can be defined. The name of the rule file can be specified in the workflow. Different workflows can use different rule files for evaluation. The following are examples of two different rule definitions:

1) Ruleset to evaluate match of externalId (Rule File—external_id_match.yml)
kind: Ruleset
name: external_id_match
spec:
   collection_rules:
     name: externalId_rule
     input_path: $.externalIds
     candidate_path: $.externalIds
     condition: (m.input.id==m.candidate.id) & (m.input.source==m.candidate.source)
   match_rules:
     name: external_id_match
     condition: (m.rulesets.externalId_rule.matched_any==True)

2) Ruleset to evaluate match of name similarity and address (Rule File—name_similarity_address_match.yml)
kind: Ruleset
name: name_similarity_and_street_address_match
spec:
   collection_rules:
     name: street_rule
     input_path: $.addresses
     candidate_path: $.addresses
     condition: (m.input.address.street1==m.candidate.address.street1)
   match_rules:
     name: name_similarity_and_street_address_match
     condition: (m.features.name_distance>95) & (m.rulesets.street_rule.matched_any==True)

And the following provides an example of further details of the attributes of the definition for the rule:

| | |
|---|---|
| collection_rules | Specify rules for the item list, cardinality 0 . . . n |
| | Provide path of the input and candidate and add a nested or simple condition |
| object_rules | Specify rules for fields, cardinality 0 . . . 1. |
| | Provide path of the input and candidate and add a nested or simple condition |
| match_rules | Specify combination of collection_rules and/or object_rules. |
| | The rule engine evaluates the match based on the condition set here. |
| | .matched-denotes the exact match of the element used in the object_rule |
| | .matched_any-denotes atleast one match in the list used in the collection_rule |
| | .matched_all-denotes all matches in the list used in the collection_rule |

Further, the rule file applicable for a specific workflow can be set as:
kind: Workflow
name: externalId match
spec:
   conditions:
     has externalId
   steps:
     name: match using externalId ruleset
     rules_match:
       ruleset: externalId_match_ruleset The rule match loads the relevant rules file data. For the input-candidate being evaluated, it returns a score of 0 if no match condition is satisfied and returns a 1 when a match condition is met.

Similar to what was described for the audit process and query optimizations results, the computing system may further select the subset of available workflows based on workflow optimization results from an audit of previous workflow executions. For example, the computing system stores data for past workflows executed by the computing system (e.g., in one or more databases 126). The computing system selects a subset of the previously executed workflows and presents the input, candidate and match results to be displayed on a computing device (e.g., client device 110). An end user selects which ones are correct and which ones are not correct (e.g., to verify whether each workflow correctly matched the input and candidate). Then the computing system uses the data provided to generate an accuracy metric or score for each workflow (e.g., based on the correct matches made by each workflow). It is to be understood that other methods and metrics can be used in example embodiments.

For example, similar metrics to what is explained above with respect to queries are also produced for each workflow:
Workflow: tradingstyles overlap and refined industry match

| Actual\Predicated | Match | No Match | |
|---|---|---|---|
| Positive | True Positive: 1,872 | False Positive: 1 | Positive Predictive Value: 99.947% +/− 0.063% |
| Negative | False Negative: 831 | True Negative: 2,500 | Negative Predictive Value: 75.053% +/− 1.176% |
| True Positive Rate: 69.256% +/− 1.254% | True Negative Rate: 99.960% +/− 0.054% | False Positive Rate: 0.040% +/− 0.054% | False Negative Rate: 30.744% +/− 1.254% |
| Accuracy: 84.012% +/− 0.996% | Precision: 99.947% +/− 0.063% | Recall: 69.256% +/− 1.254% | F1 Score: 81.818% +/− 1.048% |

In one example, the computing system (e.g., via the router) uses the metrics derived from the confusion matrix of each workflow to optimize which workflows to execute and to give the user the best result. Specifically, the computing system is attempting to maximize the True Positive Rate (TPR) while minimizing the False Positive Rate (FPR). TPR measures how frequently the workflow indicates two things are the same when they are in fact the same while FPR measures how frequently the workflow indicates two things are the same when they are in fact nt the same. Optimizing both of these metrics allows the computing system to select the best workflows to evaluate an input-candidate pair. Additionally, given competing results from multiple workflows, the computing system can return results to the user from the workflow that has the largest TPR and the smallest FPR.

As explained above, the optimization results can be updated regularly based on updated audits done on a periodic basis (e.g., based on new or additional data) so that the optimization results are always up to date and most accurate. In this way the computing system has an automatic feedback loop to tweak workflow options to continuously adapt to changing data and use cases. This feedback loop is also used to improve machine learning models described herein.

The optimization results for each workflow, such as the accuracy score, can then be used to select the best workflow options for a given input, which provides for a more efficient and effective system and results. For example, instead of using all of the relevant workflow options (e.g., taking up valuable processing resources), the computing system selects the workflow options relevant to the input that have an accuracy score (or other metric) above a certain threshold. For instance, an accuracy score may be between 0 and 1. A threshold may be set at 0.85. Thus, the computing system would only select workflow options relevant to the input that have an accuracy score over 0.85. For example, the computing device determines that there are 10 workflow options relevant to a given input. In this example, workflow option 1 has an accuracy score of 0.91, workflow option 2 has an accuracy score of 0.45, workflow option 3 has an accuracy score of 0.89, workflow option 4 has an accuracy score of 0.97, workflow option 5 has an accuracy of 0.73, and the rest of the workflow options have an accuracy score of 0.32, 0.80, 0.44, 0.69, and 0.84 respectively. The computing system would select workflow options 1, 3, and 4 since they all have an accuracy score over the threshold 0.85 accuracy score.

In another example, consider four potential workflows for an input-candidate pair:
Workflow 1: TPR=0.9, FPR=0.1
Workflow 2: TPR=0.8, FPR=0.8
Workflow 3: TPR=0.95, FPR=0.01
Workflow 4: TPR=0.91, FPR=0.5

If the service was configured to only execute two workflows (e.g., for performance), the computing system would choose to execute workflows 1 and 3 because these two workflows have the largest TPR and Smallest FPR.

In operation 316, the computing system determines an order in which the selected subset of workflows is to be executed. In one example, the order is also determined based on the workflow optimization results. In one example, the computing system prioritizes the workflow options from the highest accuracy score to the lowest accuracy score. In this example, the workflow options would be prioritized to execute workflow option 4 (with an accuracy score of 0.97), query option 1 (with an accuracy score of 0.91), and query option 3 (with an accuracy score of 0.89).

In another example, consider four potential workflows for an input-candidate pair:
Workflow 1: TPR=0.9, FPR=0.1
Workflow 2: TPR=0.8, FPR=0.8
Workflow 3: TPR=0.95, FPR=0.01
Workflow 4: TPR=0.91, FPR=0.5

If the service was configured to only execute two workflows (e.g., for performance), the computing system would choose to execute workflows 1 and 3 because these two workflows have the largest TPR and Smallest FPR. Additionally, it would execute workflow 3 first followed by workflow 1 because workflow 3 has both a larger TPR and a smaller FPR than workflow 1.

In operation 318, the computing system executes the subset of workflows in the determined order to generate a match score indicating the probability that the candidate matches the input. For example, the computing system gets the steps specified in the workflow configuration and converts each step into a task. For example, if the step is "remove stop words on input.name" the computing system converts this step to a task "remove_stop_words." The computing system then executes a function corresponding to the task that is defined in the workflow as core, feature, or refinement functions.

As explained above, for an input-candidate pair, one or more workflows can be executed. Each workflow gest a fresh copy of the input-candidate data, hence the changes of refinements in a workflow do not affect the subsequent workflows.

In one example, each workflow has an associated condition indicating whether or not to proceed to a next workflow in the selected subset of workflows based on an output of a currently executing workflow. When the condition has been met, the computing system terminates execution of the selected subset of workflows and sets the output of the selected subset of workflows to the output of the particular workflow. For example, the condition is that a match is found. Once a match is found in the workflow sequence, subsequent workflows are not evaluated. The processing continues for the next input-candidate pair.

Figure 4:
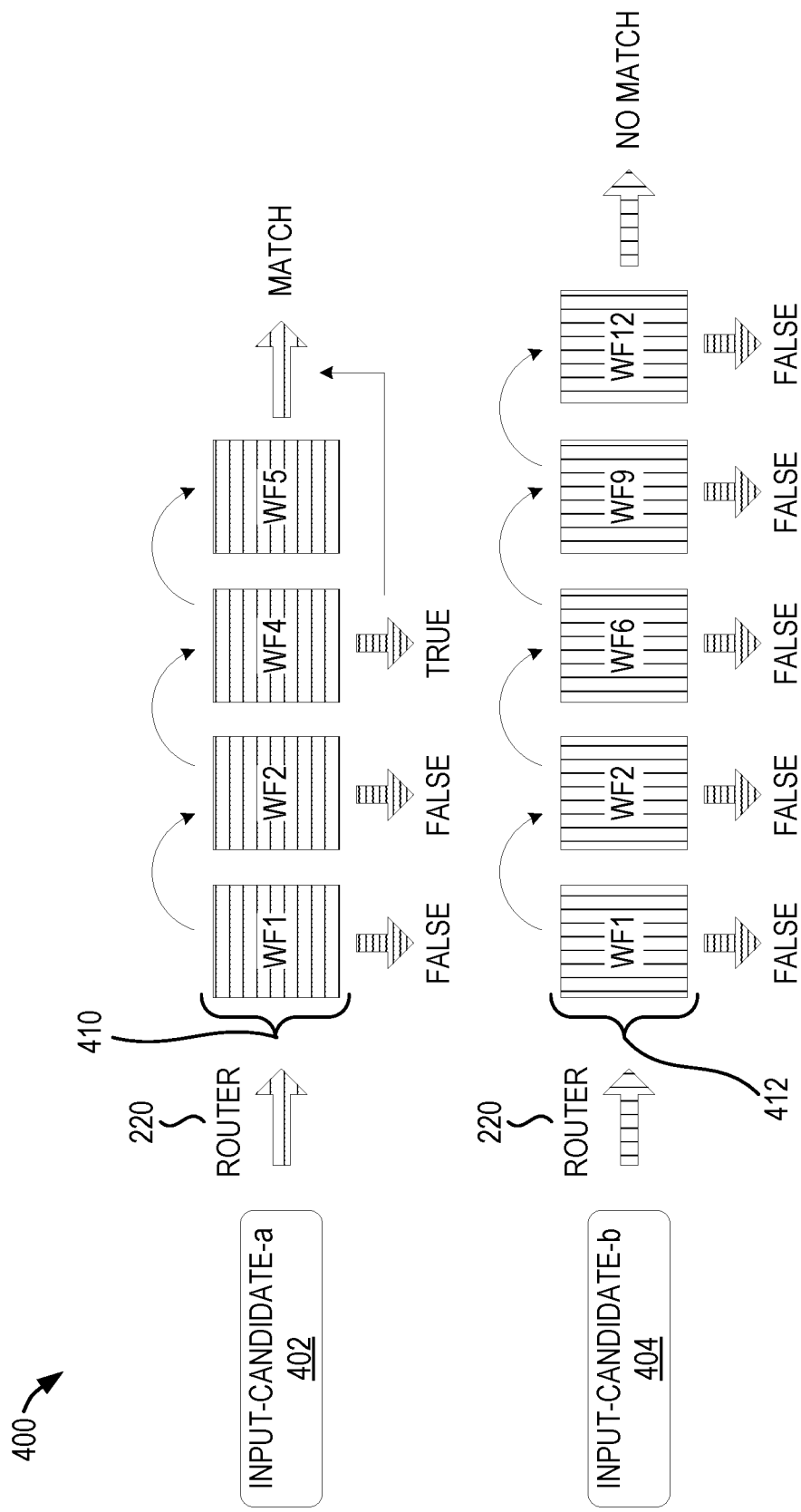
FIG. 4 illustrates an example of execution of a selected subset of workflows for two input-candidates, according to some example embodiments.

FIG. 4 illustrates an example 400 of execution of a selected subset of workflows for an input-candidate 402 and input-candidate 404. The input-candidate 402 has a selected subset of workflows 410 (e.g., WF1, WF2, WF4, WF5). The router 220 executes the selected subset of workflows 410 in the order shown. As can be seen, no match is found after executing WF1 and WF2, but a match is found after executing WF4. Accordingly, the router 220 terminates execution of the selected subset of workflows 410 (even though WF5 has not been executed) and outputs a match from the execution of WF4.

The input-candidate 404 has a selected subset of workflows 412 (e.g., WF1, WF2, WF6, WF9, WF12). The router 220 executes the selected subset of workflows 412 in the order shown. As can be seen, no match is found after executing all of the workflows of the selected subset of workflows 412, and thus, the output is a "no match," indicating that the candidate of the input-candidate 404 does not match the input.

In one example, the result of the matching is a score between 0 to 1 for all candidates selected for an input. In one example, the result of the matching is a 0 (no match) or a 1 (match). As explained above, the core matching is evaluated either via the predicates (rules), the machine model, or other method.

In operation 320, the computing system provides an output with match results (e.g., which candidates match the input and which candidates do not match the input). In one example, the computing system provides an output indicating at least the candidates that matched the input based on the generated match score for each candidate. The results can be displayed on a computing device or used in a variety of use cases behind the scenes.

Some example use cases include matching invoices from different sources, matching an organization from different sources, or other entity matching between sources. In one example use case, a company such as SAP can have one or more SAP systems like Concur, Ariba, S/4Hana, Fieldglass, and so forth. Using an example of "Delta Airlines," this can be a provider in Concur's travel system, have a supplier profile in Ariba, and be a part of the Enterprise Resource Planning in S/4Hana. To identify this entity across different SAP systems, a matching service can be used and a dashboard giving a unified view of spend across different systems can be based on the results from the systems and methods described herein.

Another example use case is to match travel booking data (e.g., metadata about a travel purchase) to travel expense data to determine if the traveler booked his or her expense using the appropriate tool. If a match can be made between the booking data which comes from the Concur booking tool that manages a customer's negotiated rates with various travel providers, a travel manager knows that the traveler was given the best contracted rate. If no match can be made, then the travel manager knows that the traveler booked his or her trip outside the Concur system and therefore did not take advantage of the contracted rates available through Concur. The match (or no match) can be based on the results from the systems and method described herein.

Figure 5:
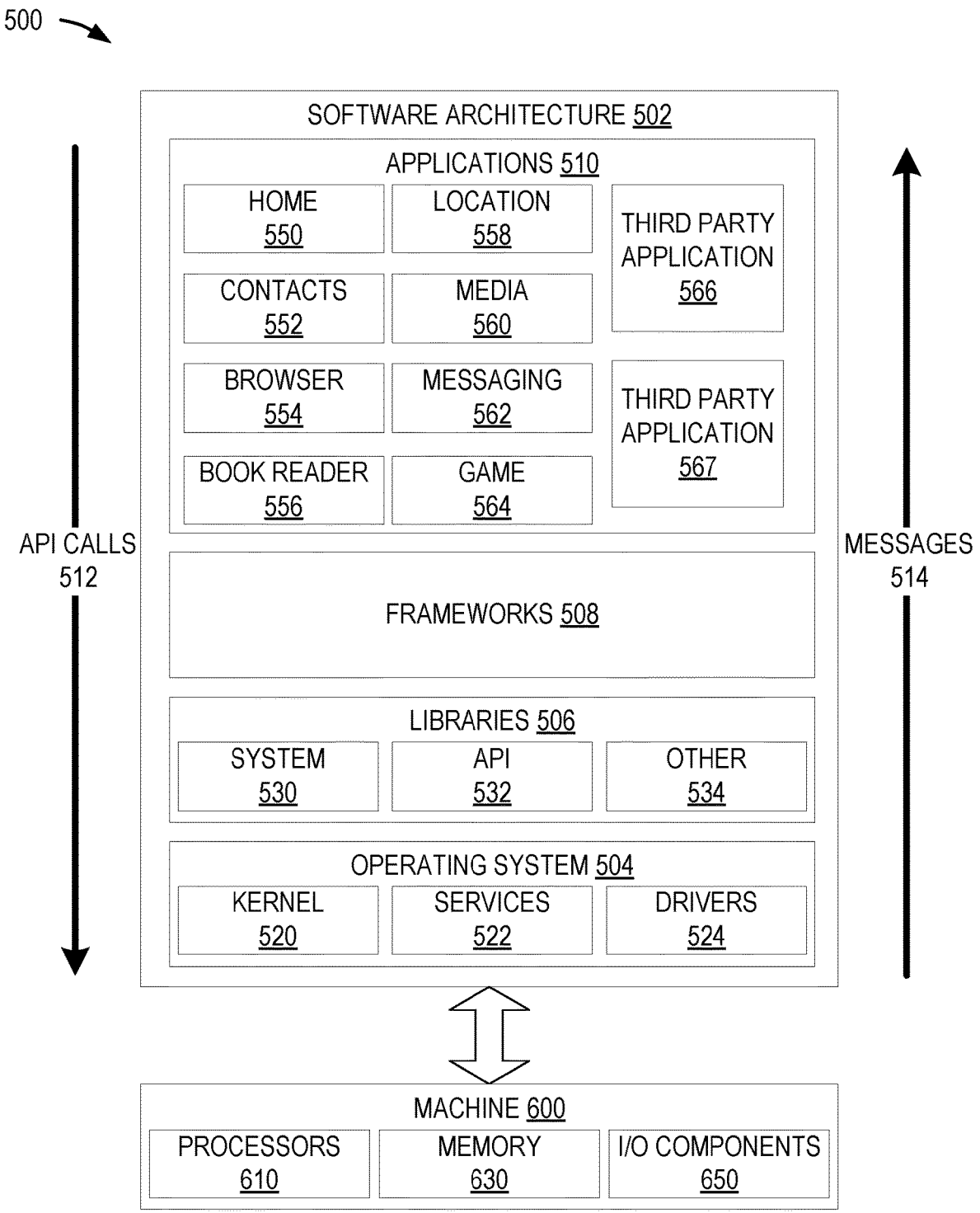
FIG. 5 is a block diagram illustrating an example of a software architecture that may be installed on a machine, according to some example embodiments.

FIG. 5 is a block diagram 500 illustrating software architecture 502, which can be installed on any one or more of the devices described above. For example, in various embodiments, client devices 110 and servers and systems 130, 102, 120, 122, and 124 may be implemented using some or all of the elements of software architecture 502. FIG. 5 is merely a non-limiting example of a software architecture, and it will be appreciated that many other architectures can be implemented to facilitate the functionality described herein. In various embodiments, the software architecture 502 is implemented by hardware such as machine 600 of FIG. 6 that includes processors 610, memory 630, and I/O components 650. In this example, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke application programming interface (API) calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphic user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications such as third-party applications 566 and 567. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
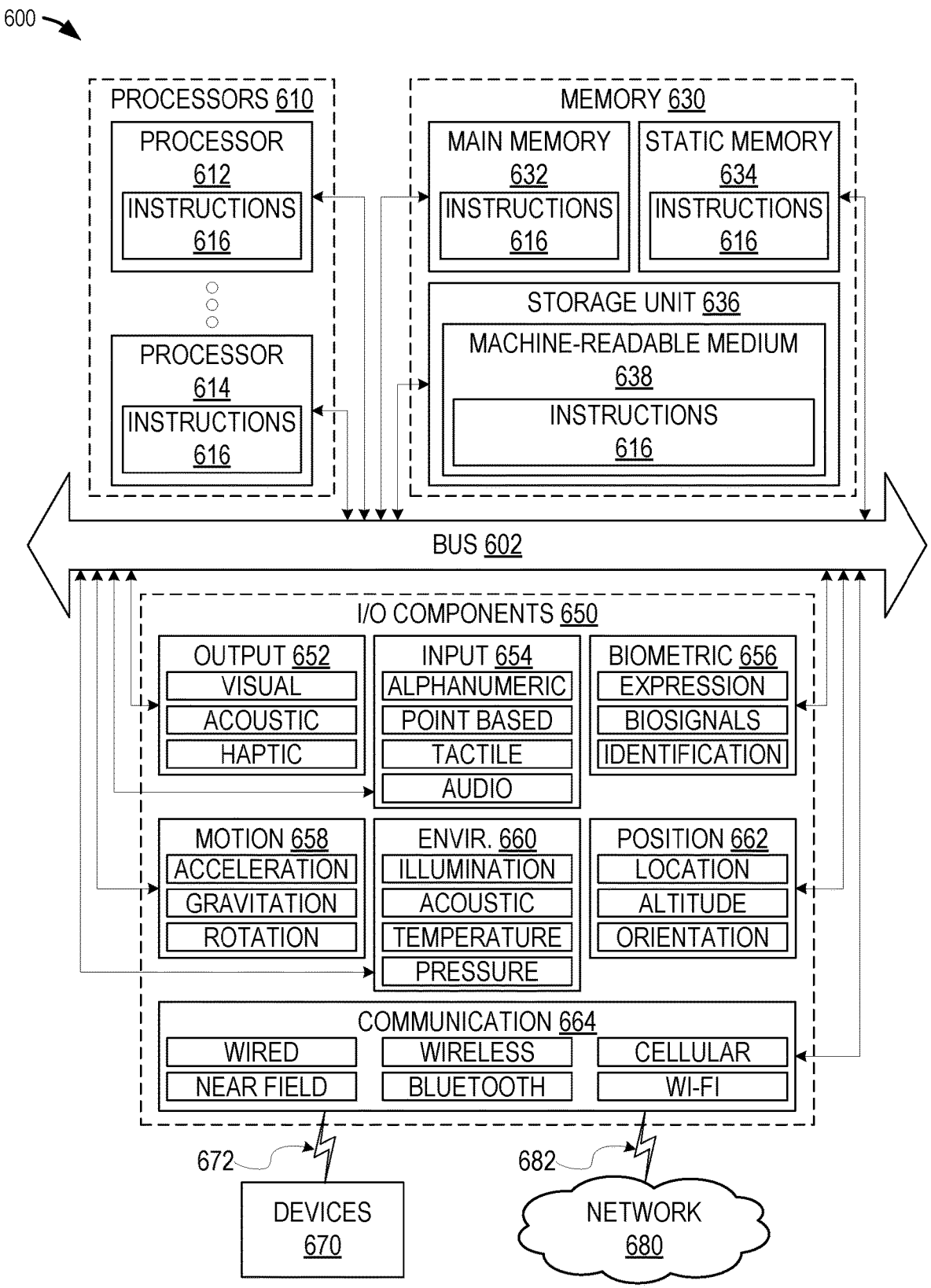
FIG. 6 illustrates a diagrammatic representation of a machine, in the form of a computer system, within which a set of instructions may be executed for causing the machine to perform any one or more of the methodologies discussed herein, according to an example embodiment.

FIG. 6 is a block diagram illustrating components of a machine 600, according to some embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application 510, an applet, an app, or other executable code) for causing the machine 600 to perform any one or more of the methodologies discussed herein can be executed. In alternative embodiments, the machine 600 operates as a standalone device or can be coupled (e.g., networked) to other machines. In a networked deployment, the machine 600 may operate in the capacity of a server machine or system 130, 102, 120, 122, 124, etc., or a client device 110 in a server-client network environment, or as a peer machine in a peer-to-peer (or distributed) network environment. The machine 600 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

In various embodiments, the machine 600 comprises processors 610, memory 630, and I/O components 650, which can be configured to communicate with each other via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 612 and a processor 614 that may execute the instructions 616. The term "processor" is intended to include multi-core processors 610 that may comprise two or more independent processors 612, 614 (also referred to as "cores") that can execute instructions 616 contemporaneously. Although FIG. 6 shows multiple processors 610, the machine 600 may include a single processor 610 with a single core, a single processor 610 with multiple cores (e.g., a multi-core processor 610), multiple processors 612, 614 with a single core, multiple processors 612, 614 with multiples cores, or any combination thereof.

The memory 630 comprises a main memory 632, a static memory 634, and a storage unit 636 accessible to the processors 610 via the bus 602, according to some embodiments. The storage unit 636 can include a machine-readable medium 638 on which are stored the instructions 616 embodying any one or more of the methodologies or functions described herein. The instructions 616 can also reside, completely or at least partially, within the main memory 632, within the static memory 634, within at least one of the processors 610 (e.g., within the processor's cache memory), or any suitable combination thereof, during execution thereof by the machine 600. Accordingly, in various embodiments, the main memory 632, the static memory 634, and the processors 610 are considered machine-readable media 638.

As used herein, the term "memory" refers to a machine-readable medium 638 able to store data temporarily or permanently and may be taken to include, but not be limited to, random-access memory (RAM), read-only memory (ROM), buffer memory, flash memory, and cache memory. While the machine-readable medium 638 is shown, in an example embodiment, to be a single medium, the term "machine-readable medium" should be taken to include a single medium or multiple media (e.g., a centralized or distributed database, or associated caches and servers) able to store the instructions 616. The term "machine-readable medium" shall also be taken to include any medium, or combination of multiple media, that is capable of storing instructions (e.g., instructions 616) for execution by a machine (e.g., machine 600), such that the instructions 616, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 650 include a wide variety of components to receive input, provide output, produce output, transmit information, exchange information, capture measurements, and so on. In general, it will be appreciated that the I/O components 650 can include many other components that are not shown in FIG. 6. The I/O components 650 are grouped according to functionality merely for simplifying the following discussion, and the grouping is in no way limiting. In various example embodiments, the I/O components 650 include output components 652 and input components 654. The output components 652 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 650 include biometric components 656, motion components 658, environmental components 660, or position components 662, among a wide array of other components. For example, the biometric components 656 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 include acceleration sensor components (e.g., accelerometer), gravitation sensor components, rotation sensor components (e.g., gyroscope), and so forth. The environmental components 660 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 662 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 650 may include communication components 664 operable to couple the machine 600 to a network 680 or devices 670 via a coupling 682 and a coupling 672, respectively. For example, the communication components 664 include a network interface component or another suitable device to interface with the network 680. In further examples, communication components 664 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 670 may be another machine 600 or any of a wide variety of peripheral devices (e.g., a peripheral device coupled via a Universal Serial Bus (USB)).

Moreover, in some embodiments, the communication components 664 detect identifiers or include components operable to detect identifiers. For example, the communication components 664 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 664, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 680 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 616 are transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, in other example embodiments, the instructions 616 are transmitted or received using a transmission medium via the coupling 672 (e.g., a peer-to-peer coupling) to the devices 670. The term "transmission medium" shall be taken to include any intangible medium that is capable of storing, encoding, or carrying the instructions 616 for execution by the machine 600, and includes digital or analog communications signals or other intangible media to facilitate communication of such software.

Furthermore, the machine-readable medium 638 is non-transitory (in other words, not having any transitory signals) in that it does not embody a propagating signal. However, labeling the machine-readable medium 638 "non-transitory" should not be construed to mean that the medium is incapable of movement; the medium 638 should be considered as being transportable from one physical location to another. Additionally, since the machine-readable medium 638 is tangible, the medium 638 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
receiving, at a computing system, an input comprising one or more attributes;
selecting, by the computing system, a subset of query options from a list of query options based on a comparison of relevant query options;
translating, by the computing system, each query option of the subset of query options into a query comprising at least one attribute of the one or more attributes of the input, to generate a set of queries;
executing, by the computing system, each query to generate a candidate list comprising a list of candidates that potentially match the input;
executing selected workflows relevant to each candidate to determine a probability that each candidate matches the input; and
providing an output indicating at least candidates that matched the input based on the probability that each candidate matches the input.

2. The computer-implemented method of claim 1, wherein the subset of query options are further selected from the list of query options based on query optimization results from an audit of previous queries.

3. The computer-implemented method of claim 2, wherein the query optimization results from the audit of previous queries comprise metrics associated with each query.

4. The computer-implemented method of claim 3, wherein the metrics comprise precision and recall.

5. The computer-implemented method of claim 2, wherein the query optimization results from the audit of previous queries are generated by performing operations comprising:
selecting a subset of previously run queries and results;
generating a confusion matrix for each query;
using the confusion matrix, deriving metrics for each query; and
storing the metrics for each query as optimization results in one or more datastores.

6. The computer-implemented method of claim 1, wherein each query option of the subset of query options is associated with an accuracy score, based on query optimization results from an audit of previous queries, that is above a predefined threshold.

7. The computer-implemented method of claim 1, wherein each query is executed in priority order until a specified number of candidates is generated, after which execution of each query in priority order is terminated.

8. The computer-implemented method of claim 1, wherein the selected workflows relevant to each candidate are executed based on workflow optimization results.

9. The computer-implemented method of claim 1, wherein the selected workflows relevant to each candidate are executed in an order from a workflow with a highest accuracy metric to a workflow with a lowest accuracy metric.

10. The computer-implemented method of claim 1, wherein the subset of query options are further selected based on a cost constraint.

11. The computer-implemented method of claim 1, wherein selecting the subset of query options from a list of query options based on a comparison of relevant query options comprises:
determining which query options are relevant query options to the one or more attributes of the input;
determining an accuracy score for each relevant query option based on query optimization results from an audit of previous queries; and
selecting the relevant query options with an accuracy score above a predefined threshold as the subset of query options.

12. A system comprising:
a memory that stores instructions; and
one or more processors configured by the instructions to perform operations comprising:
receiving an input comprising one or more attributes;
selecting a subset of query options from a list of query options based on a comparison of relevant query options;
translating each query option of the subset of query options into a query comprising at least one attribute of the one or more attributes of the input, to generate a set of queries;
executing each query to generate a candidate list comprising a list of candidates that potentially match the input;
executing selected workflows relevant to each candidate to determine a probability that each candidate matches the input; and
providing an output indicating at least candidates that matched the input based on the probability that each candidate matches the input.

13. The system of claim 12, wherein the subset of query options are further selected from the list of query options based on query optimization results from an audit of previous queries.

14. The system of claim 13, wherein the query optimization results from the audit of previous queries comprise metrics associated with each query.

15. The system of claim 14, wherein the metrics comprise precision and recall.

16. The system of claim 13, wherein the query optimization results from the audit of previous queries are generated by performing operations comprising:
selecting a subset of previously run queries and results;
generating a confusion matrix for each query;
using the confusion matrix, deriving metrics for each query; and
storing the metrics for each query as optimization results in one or more datastores.

17. The system of claim 12, wherein each query option of the subset of query options is associated with an accuracy score, based on query optimization results from an audit of previous queries, that is above a predefined threshold.

18. The system of claim 12, wherein each query is executed in priority order until a specified number of candidates is generated, after which execution of each query in priority order is terminated.

19. The system of claim 12, wherein the selected workflows relevant to each candidate are executed based on workflow optimization results or wherein the selected workflows relevant to each candidate are executed in an order from a workflow with a highest accuracy metric to a workflow with a lowest accuracy metric.

20. A non-transitory computer-readable medium comprising instructions stored thereon that are executable by at least one processor to cause a computing device to perform operations comprising:
- receiving an input comprising one or more attributes;
- selecting a subset of query options from a list of query options based on a comparison of relevant query options;
- translating each query option of the subset of query options into a query comprising at least one attribute of the one or more attributes of the input, to generate a set of queries;
- executing each query to generate a candidate list comprising a list of candidates that potentially match the input;
- executing selected workflows relevant to each candidate to determine a probability that each candidate matches the input; and
- providing an output indicating at least candidates that matched the input based on the probability that each candidate matches the input.

* * * * *